Feb. 12, 1952   O. J. HOBSON   2,585,316
SHOCK OPERATED FLUID VALVE
Filed Oct. 11, 1948
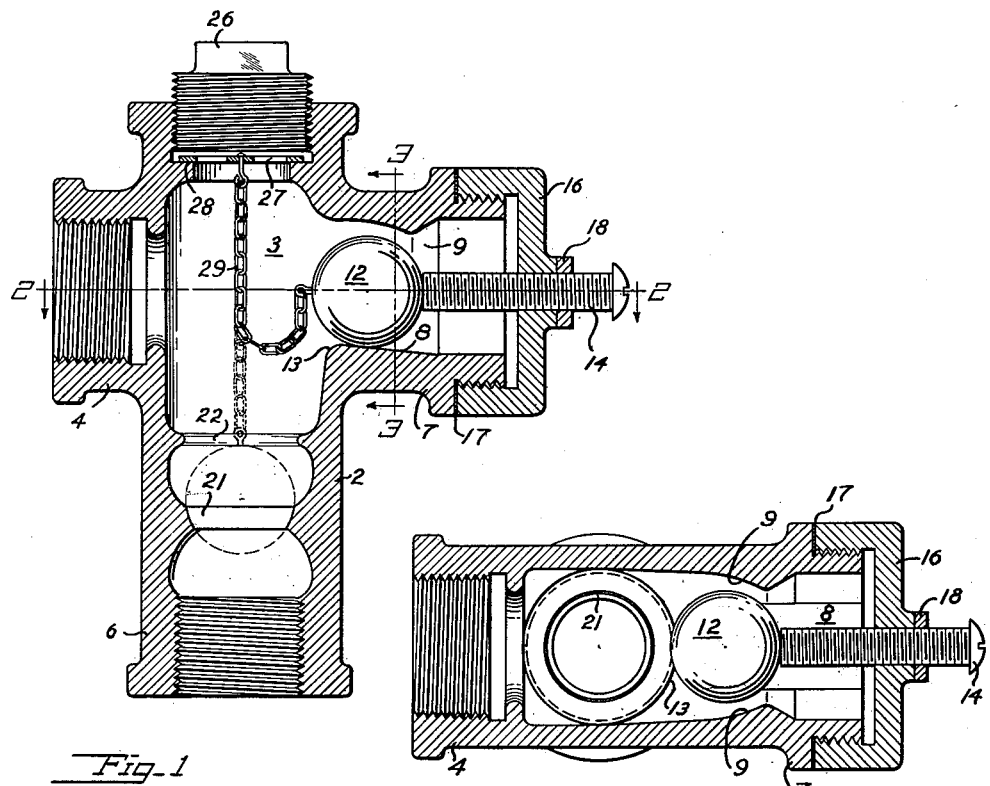
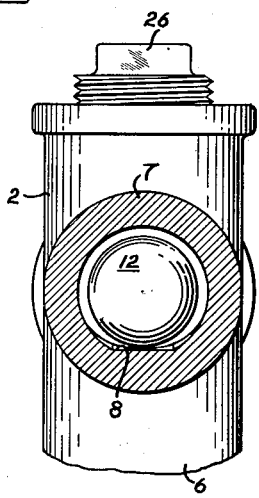
INVENTOR
OLIVER J. HOBSON
BY Charles S. Evans
his ATTORNEY Patented Feb. 12, 1952

2,585,316

UNITED STATES PATENT OFFICE 2,585,316

SHOCK OPERATED FLUID VALVE

Oliver J. Hobson, Redwood City, Calif.

Application October 11, 1948, Serial No. 53,845

2 Claims. (Cl. 137—139)

My invention relates to valves for controlling the flow of fluid through a pipe; and the principal object of the invention is to provide a normally open valve which closes when subjected to a shock such as produced by an earthquake. One of the secondary objects is the provision of such a valve which is readily reset in open position after closing. Another object is the provision of such a valve which is entirely enclosed within the passage through which the fluid flows and which has but a single moving part without bearings or packing glands.

The invention has other objects which will be explained in the following description of that form of the invention which is illustrated in the drawings. It is to be understood that the invention is not limited to this single embodiment, but may be included in a plurality of forms as set forth in the claims.

Referring to the drawings: Figure 1 is a vertical, central section through my valve. Figure 2 is a horizontal section taken in a plane indicated by the line 2—2 of Figure 1. Figure 3 is an elevation, partly in vertical section taken in a plane indicated by the line 3—3 of Figure 1.

Fires following an earthquake are frequently more destructive and more to be dreaded than the quake itself; and wherever earthquakes are common, precautions are taken and rigid regulations enforced relative to the use of fuel gas and oil immediately following the quake, because of ruptured pipes and fittings and injury to connected appliances.

Experience has shown that even otherwise intelligent persons in the emergency and excitement of an earthquake, either do not realize the necessity of shutting off the flow of fuel until the lines can be checked for breaks, or they do not know the location of the control valves or how to operate them. Because of these facts, it is the broad purpose of my invention to provide an automatically closing, but normally open valve, located on the outside of the building, so that when the valve closes, as it is set to do, upon a shock of sufficient intensity to endanger the pipes and connections in the building, fuel gas or oil flowing through the pipes is stopped at the valve and does not enter the building to feed or start a local fire should any break have occurred.

Once closed, the valve remains closed until manually reset in open position after the emergency is over.

My valve comprises a housing 2 of generally cruciform shape, each arm of the cross being hollow and of circular cross section, and opening out of a central chamber 3. Figure 1 of the drawing shows the valve open and in position of normal use, the closed position of the valve body is shown in dotted lines. The hollow arm 4 on the side of the housing is threaded for connection to the pipe carrying the incoming fuel; and the arm 6 at the lower end of the housing is threaded for connection to the pipe leading into the building.

Preferably opposite the incoming fuel, the arm 7 is somewhat extended to provide a chamber having a floor 8 slanting downwardly toward the free end of the arm as shown; and with parabolic walls 9 on the sides of and above the sloping floor.

A valve body 12, preferably a bronze or brass ball, is seated on the floor adjacent the edge 13, the floor thus forming a supporting ledge for the ball. The distance which the ball lies from the edge is adjustably varied by the screw 14 threaded in the cap 16. The cap screws up tight against a gasket 17, and with a tight screw and lock nut 18, a gas tight closure is made at the end of the ball chamber.

The floor 8, as can be readily ascertained from Fig. 3 of the drawing, is concave from the edge 13 of the supporting ledge back to a point approximating the line 3—3 of Fig. 1, and thereafter the floor 8 gradually flattens out. Thus, the ball rests on the concave portion of floor 8 all as clearly shown in Fig. 3.

It will be apparent that because of the slanting floor of the ball chamber the intensity of the shock necessary to dislodge the ball increases with the distance of the ball from the edge 13. Thus the adjusting screw 14 may be turned to position the ball where it will require a really disrupting shock to throw the ball from its seat and over the edge of the ledge, so that it falls upon and closes the spherical valve seat 21. In the event the shock throws the ball against the side or top walls of the ball chamber, the parabolic surfaces tend to deflect the ball out of the chamber.

To prevent a second shock reseating the ball on the ledge, an annular flange 22 is arranged in the housing just above the valve seat. The opening in the flange is sufficient only to pass the ball, so that following shocks could throw the ball only straight up; and reseating the ball on the ledge could not occur.

With the seating of the ball on the valve seat, flow of gas is cut off, and of course it follows that leakage from broken pipes or appliances is limited to the fuel in the pipes at the time of the shock. Since my shock valve is located exterior to the building preferably between main shut off valve and meter, and the quantity of fuel in the pipes in the building is small, escape of fuel into the building in quantity sufficient to be dangerous is prevented.

In order to reset the shock valve after the ball has once seated on the valve seat 21, the main shut off valve is closed, and the plug 26 unscrewed. This gives access to the apertured anchor disk 27 resting on the flange 28 below the plug. A short chain 29 connects the disk to the ball, and by lifting the disk, the ball may be swung over to its seat, or pushed into position with a finger. Replacing the disk and plug completes the resetting procedure.

In setting and re-setting the ball on the ledge, when the point of attachment of the chain 29 is placed in the horizontal axis of the ball as it is shown positioned in Fig. 1, the zone of contact with the valve seat will be a zone free of contact with the housing when the ball is on the ledge. Therefore, any deposit on the ball as a result of condensation or corrosion, which tends to collect at the point of contact with the ledge, will be above the zone of contact with the valve seat and not interfere with the tight closing of the valve when a shock causes it to fall. This zone of contact is a predetermined circumferential area on the ball (see Fig. 1) because the chain is only long enough to permit seating of the ball without slack in the chain.

I claim:

1. A shock operated fluid valve, comprising a housing of generally cruciform shape and having a central chamber opening on each of the four ends of the cross, a valve seat at the low end of the chamber in normal fixed position of the housing, means for connecting a pipe into the chamber below the valve seat, means for connecting a pipe into the chamber at one of the side openings thereof, a ledge in the chamber in the other side opening, a ball normally resting on the ledge and fitting the valve seat, means including a closure for the last named side opening for adjusting the ball on the ledge, a closure for the upper opening of the chamber, and means connected to the housing in the upper opening and to the ball consisting of a chain which has substantially no slack when the ball is on the valve seat.

2. A shock operated fluid valve, comprising a housing having a passage therethrough, a ledge in the housing adjacent to and sloping away from the passage, a circular valve seat in the housing around the passage and below the ledge, a ball fitting both valve seat and ledge, said valve seat being of a diameter less than the diameter of the ball, a chain connecting a point on the ball lying in its horizontal axis when at rest on the ledge to a point on the housing vertically above the center of the valve seat and having no slack when the ball is on the valve seat, adjustable stop means on the housing to retain the ball in selected position on the ledge, and a parabolic wall at each side and above the normal position of the ball on the ledge.

OLIVER J. HOBSON.

REFERENCES CITED

The following references are of record in the file of this patent:

UNITED STATES PATENTS

| Number | Name | Date |
|---|---|---|
| 337,350 | Russell | Mar. 2, 1886 |
| 719,842 | McCormick | Feb. 3, 1903 |
| 756,282 | Rankin | Apr. 5, 1904 |
| 1,580,277 | Bard | Apr. 13, 1926 |
| 2,093,144 | Brunell | Sept. 14, 1937 |
| 2,215,044 | Kammerdiner | Sept. 17, 1940 |

FOREIGN PATENTS

| Number | Country | Date |
|---|---|---|
| 5,232 | Great Britain | of 1883 |